US012220671B2

United States Patent

(12) United States Patent
Luharuka et al.
(10) Patent No.: US 12,220,671 B2
(45) Date of Patent: Feb. 11, 2025

(54) MIXING APPARATUS WITH FLUSH LINE AND METHOD

(71) Applicant: Schlumberger Technology Corporation, Sugar Land, TX (US)

(72) Inventors: Rajesh Luharuka, Sugar Land, TX (US); Gocha Chochua, Sugar Land, TX (US); Hau Nguyen-Phuc Pham, Houston, TX (US); Mark Ayyad, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/484,668

(22) Filed: Oct. 11, 2023

(65) Prior Publication Data

US 2024/0033695 A1 Feb. 1, 2024

Related U.S. Application Data

(63) Continuation of application No. 14/192,838, filed on Feb. 27, 2014, now Pat. No. 11,819,810.

(51) Int. Cl.
*B01F 23/53* (2022.01)
*B01F 25/53* (2022.01)
(Continued)

(52) U.S. Cl.
CPC .............. *B01F 23/53* (2022.01); *B01F 25/53* (2022.01); *B01F 25/85* (2022.01); *B01F 27/192* (2022.01); *B01F 27/8111* (2022.01)

(58) Field of Classification Search
CPC ...... B01F 25/85; B01F 25/53; B01F 27/8111; B01F 27/192
See application file for complete search history.

(56) References Cited

U.S. PATENT DOCUMENTS

| | | |
|---|---|---|
| 559,965 A | 5/1896 | Bierstadt |
| 896,233 A | 8/1908 | McQueen |

(Continued)

FOREIGN PATENT DOCUMENTS

| | | |
|---|---|---|
| CA | 2643743 C | 4/2011 |
| CN | 2601189 Y | 1/2004 |

(Continued)

OTHER PUBLICATIONS

Natural gas flow measurement, written and compiled by Long Yangming, Petroleum Industry Press, pp. 84-85, Mar. 1962.

(Continued)

*Primary Examiner* — Marc C Howell
(74) *Attorney, Agent, or Firm* — Jeffrey D. Frantz

(57) ABSTRACT

A mixer and method for mixing are provided. The mixer includes a housing including a fluid inlet, an additive inlet, and an outlet. The housing defines a mixing chamber in fluid communication with the fluid inlet, the additive inlet, and the outlet. The mixer also includes an impeller disposed in the mixing chamber. When rotated, the impeller pumps fluid through the fluid inlet. The mixer also includes a slinger disposed in the mixing chamber and configured to receive the fluid from the impeller and to receive an additive from the additive inlet. When rotated, the slinger slings the fluid and the additive radially outwards. The mixer further includes a flush line extending between the mixing chamber and the additive inlet. The flush line is receives, from the mixing chamber, a portion of the fluid pumped by the impeller and to deliver the portion of the fluid to the additive inlet.

20 Claims, 10 Drawing Sheets

(51) Int. Cl.

| | |
|---|---|
| ***B01F 25/85*** | (2022.01) |
| ***B01F 27/192*** | (2022.01) |
| ***B01F 27/81*** | (2022.01) |

(56) References Cited

U.S. PATENT DOCUMENTS

| | | | | | |
|---|---|---|---|---|---|
| 1,526,527 | A | | 2/1925 | Butler | |
| 1,560,826 | A | | 11/1925 | Lester | |
| 1,576,940 | A | | 3/1926 | Arthur | |
| 2,073,652 | A | | 3/1937 | Robb | |
| 2,099,898 | A | | 11/1937 | Larkin | |
| 2,357,583 | A | | 9/1944 | Franco | |
| 2,735,839 | A | | 2/1956 | Schrenk | |
| 2,774,497 | A | | 12/1956 | Martin | |
| 2,792,262 | A | | 5/1957 | Hathorn | |
| 2,858,950 | A | | 11/1958 | Martin | |
| 3,155,248 | A | | 11/1964 | Haller | |
| 3,170,560 | A | | 2/1965 | Obmascher | |
| 3,208,616 | A | | 9/1965 | Roy | |
| 3,263,436 | A | | 8/1966 | Goldfarb | |
| 3,314,557 | A | | 4/1967 | Sackett, Sr. | |
| 3,378,152 | A | | 4/1968 | Warner | |
| 3,394,961 | A | | 7/1968 | Gedeon | |
| 3,451,986 | A | | 6/1969 | Metais | |
| 3,490,632 | A | | 1/1970 | Mckinney | |
| 3,497,327 | A | | 2/1970 | Kehse | |
| 3,560,053 | A | | 2/1971 | Ortloff | |
| 3,618,801 | A | | 11/1971 | Blanchard | |
| 3,666,129 | A | | 5/1972 | Haskins | |
| 3,687,319 | A | | 8/1972 | Adam | |
| 3,743,108 | A | | 7/1973 | Visser | |
| 3,756,443 | A | | 9/1973 | Verschage et al. | |
| 3,787,479 | A | | 1/1974 | Grehl | |
| 3,842,910 | A | | 10/1974 | Zingg et al. | |
| 3,883,019 | A | | 5/1975 | Hansen, Jr. | |
| 3,883,148 | A | | 5/1975 | Miller | |
| 3,894,645 | A | | 7/1975 | Verschage | |
| 3,938,673 | A | | 2/1976 | Perry, Jr. | |
| 3,974,602 | A | | 8/1976 | Pohl et al. | |
| 3,985,254 | A | | 10/1976 | Grandury | |
| 3,998,433 | A | | 12/1976 | Iwako | |
| 4,026,441 | A | | 5/1977 | Jones | |
| 4,077,612 | A | | 3/1978 | Ricciardi | |
| 4,079,150 | A | | 3/1978 | Beck et al. | |
| 4,090,623 | A | | 5/1978 | Noyon | |
| 4,099,005 | A | * | 7/1978 | Fullington | B01F 23/50 544/190 |
| 4,103,793 | A | | 8/1978 | Weaver | |
| 4,111,314 | A | | 9/1978 | Nelson | |
| 4,178,117 | A | | 12/1979 | Brugler | |
| 4,187,047 | A | | 2/1980 | Squifflet, Sr. | |
| 4,209,278 | A | | 6/1980 | Cooper et al. | |
| 4,222,498 | A | | 9/1980 | Brock | |
| 4,248,359 | A | | 2/1981 | Brock | |
| 4,249,848 | A | | 2/1981 | Griffin et al. | |
| 4,268,208 | A | | 5/1981 | Hankins et al. | |
| 4,337,014 | A | | 6/1982 | Farnham | |
| 4,348,146 | A | | 9/1982 | Brock | |
| 4,373,857 | A | | 2/1983 | Giles | |
| 4,375,343 | A | | 3/1983 | Butler | |
| 4,400,126 | A | | 8/1983 | Desourdy | |
| 4,427,133 | A | | 1/1984 | Kierbow et al. | |
| 4,453,829 | A | | 6/1984 | Althouse, III | |
| 4,465,420 | A | | 8/1984 | Dillman | |
| 4,494,903 | A | | 1/1985 | Badicel | |
| 4,561,821 | A | | 12/1985 | Dillman | |
| 4,579,496 | A | | 4/1986 | Gerlach | |
| 4,601,628 | A | | 7/1986 | Lowing | |
| 4,621,972 | A | | 11/1986 | Grotte | |
| 4,624,357 | A | | 11/1986 | Oury | |
| 4,626,166 | A | | 12/1986 | Jolly | |
| 4,671,665 | A | * | 6/1987 | McIntire | B01F 27/81 96/213 |
| 4,701,095 | A | | 10/1987 | Berryman et al. | |
| 4,775,275 | A | | 10/1988 | Perry | |
| 4,808,004 | A | | 2/1989 | McIntire et al. | |
| 4,832,561 | A | | 5/1989 | Nijenhuis | |
| 4,834,542 | A | * | 5/1989 | Sherwood | B01F 25/743 366/65 |
| 4,850,750 | A | | 7/1989 | Cogbill et al. | |
| 4,855,960 | A | | 8/1989 | Janssen et al. | |
| 4,883,363 | A | | 11/1989 | Pillon et al. | |
| 4,899,832 | A | | 2/1990 | Bierscheid, Jr. | |
| 4,907,712 | A | | 3/1990 | Stempin | |
| 4,917,560 | A | | 4/1990 | Murray et al. | |
| 4,925,358 | A | | 5/1990 | Cook | |
| 4,944,646 | A | | 7/1990 | Edwards et al. | |
| 5,006,034 | A | | 4/1991 | Bragg et al. | |
| 5,018,932 | A | | 5/1991 | Croisier | |
| 5,035,269 | A | | 7/1991 | Pytryga et al. | |
| 5,046,856 | A | | 9/1991 | McIntire | |
| 5,052,486 | A | | 10/1991 | Wilson | |
| 5,121,989 | A | | 6/1992 | Horton et al. | |
| 5,190,374 | A | | 3/1993 | Harms et al. | |
| 5,195,861 | A | | 3/1993 | Handke | |
| 5,201,498 | A | | 4/1993 | Akins | |
| 5,236,261 | A | | 8/1993 | Hagenbuch | |
| 5,339,996 | A | | 8/1994 | Dubbert et al. | |
| 5,362,193 | A | | 11/1994 | Milstead | |
| 5,382,411 | A | | 1/1995 | Allen | |
| 5,387,736 | A | | 2/1995 | Salomone et al. | |
| 5,413,154 | A | | 5/1995 | Hurst, Jr. et al. | |
| 5,426,137 | A | | 6/1995 | Allen | |
| 5,427,497 | A | | 6/1995 | Dillman | |
| 5,571,281 | A | * | 11/1996 | Allen | B01F 25/3131 366/178.3 |
| 5,667,298 | A | | 9/1997 | Musil et al. | |
| 5,685,416 | A | | 11/1997 | Bonnet | |
| 5,775,713 | A | | 7/1998 | Peterson et al. | |
| 5,777,234 | A | | 7/1998 | Kosmal | |
| 5,785,421 | A | | 7/1998 | Milek | |
| 5,795,062 | A | | 8/1998 | Johnson | |
| 5,822,930 | A | | 10/1998 | Klein | |
| 5,964,566 | A | | 10/1999 | Stewart | |
| 6,000,840 | A | | 12/1999 | Paterson | |
| 6,050,743 | A | | 4/2000 | Medinger | |
| 6,186,195 | B1 | | 2/2001 | Anstotz | |
| 6,186,654 | B1 | | 2/2001 | Gunteret, Jr. et al. | |
| 6,193,402 | B1 | | 2/2001 | Grimland et al. | |
| 6,286,986 | B2 | | 9/2001 | Grimland et al. | |
| 6,293,689 | B1 | | 9/2001 | Guntert, Jr. et al. | |
| 6,447,674 | B1 | | 9/2002 | Simon et al. | |
| 6,474,926 | B2 | | 11/2002 | Weiss | |
| 6,491,421 | B2 | | 12/2002 | Rondeau et al. | |
| 6,527,428 | B2 | | 3/2003 | Guntert, Jr. et al. | |
| 6,832,851 | B1 | | 12/2004 | von Wilcken | |
| 6,939,031 | B2 | | 9/2005 | Pham et al. | |
| 6,948,535 | B2 | | 9/2005 | Stegemoeller | |
| 7,048,432 | B2 | | 5/2006 | Phillippi et al. | |
| 7,104,328 | B2 | | 9/2006 | Phillippi et al. | |
| 7,214,028 | B2 | | 5/2007 | Boasso et al. | |
| 7,258,522 | B2 | | 8/2007 | Pham et al. | |
| 7,308,953 | B2 | | 12/2007 | Barnes | |
| 7,419,296 | B2 | | 9/2008 | Allen | |
| 7,424,943 | B2 | | 9/2008 | Gausman | |
| 7,540,308 | B2 | | 6/2009 | Pessin et al. | |
| 7,614,451 | B2 | | 11/2009 | Blaschke et al. | |
| 7,703,518 | B2 | | 4/2010 | Phillippi et al. | |
| 7,815,222 | B2 | | 10/2010 | Markham | |
| 7,836,949 | B2 | | 11/2010 | Dykstra | |
| 7,837,427 | B2 | | 11/2010 | Beckel et al. | |
| 7,841,394 | B2 | | 11/2010 | McNeel et al. | |
| 7,845,413 | B2 | | 12/2010 | Shampine et al. | |
| 7,866,881 | B2 | | 1/2011 | El Kholy et al. | |
| 7,921,914 | B2 | | 4/2011 | Bruins et al. | |
| 7,926,564 | B2 | | 4/2011 | Phillippi et al. | |
| 7,931,088 | B2 | | 4/2011 | Stegemoeller et al. | |
| 8,066,955 | B2 | | 11/2011 | Pinchot | |
| 8,083,083 | B1 | | 12/2011 | Mohns | |
| 8,127,844 | B2 | | 3/2012 | Luharuka et al. | |
| 8,137,051 | B2 | | 3/2012 | Glenn et al. | |
| 8,142,134 | B2 | | 3/2012 | Lavoie et al. | |
| 8,146,665 | B2 | | 4/2012 | Neal | |
| 8,313,269 | B2 | | 11/2012 | Fisher et al. | |

(56) References Cited

U.S. PATENT DOCUMENTS

| | | | |
|---|---|---|---|
| 8,354,602 | B2 | 1/2013 | Lucas et al. |
| 8,585,341 | B1 | 11/2013 | Oren et al. |
| 8,651,792 | B2 | 2/2014 | Friesen |
| 8,661,743 | B2 | 3/2014 | Flusche |
| 8,726,584 | B1 | 5/2014 | Nolte et al. |
| 8,734,081 | B2 | 5/2014 | Stegemoeller et al. |
| 8,834,012 | B2 | 9/2014 | Case |
| 8,926,252 | B2 | 1/2015 | McIver et al. |
| 8,931,996 | B2 | 1/2015 | Friesen et al. |
| 8,944,740 | B2 | 2/2015 | Teichrob et al. |
| 9,017,001 | B1 | 4/2015 | Dueck |
| 9,097,033 | B2 | 8/2015 | Margevicius et al. |
| 9,457,335 | B2 | 10/2016 | Pham et al. |
| 9,475,029 | B2 | 10/2016 | McSpadden et al. |
| 9,663,303 | B2 | 5/2017 | Waldner et al. |
| 9,688,178 | B2 | 6/2017 | Pham |
| 9,862,538 | B2 | 1/2018 | Pham et al. |
| 2002/0034120 | A1 | 3/2002 | Guntert, Jr. et al. |
| 2002/0147370 | A1 | 10/2002 | Hinz et al. |
| 2003/0150494 | A1 | 8/2003 | Morgan et al. |
| 2003/0161212 | A1 | 8/2003 | Neal et al. |
| 2003/0196809 | A1 | 10/2003 | Willberg et al. |
| 2003/0202869 | A1 | 10/2003 | Posch |
| 2003/0227817 | A1 | 12/2003 | Martel et al. |
| 2004/0008571 | A1 | 1/2004 | Coody et al. |
| 2004/0209780 | A1 | 10/2004 | Harris et al. |
| 2004/0256106 | A1 | 12/2004 | Phillippi et al. |
| 2005/0028979 | A1 | 2/2005 | Brannon et al. |
| 2005/0067351 | A1 | 3/2005 | Graham |
| 2005/0091941 | A1 | 5/2005 | Baird |
| 2005/0123385 | A1 | 6/2005 | Kirsch |
| 2005/0201197 | A1* | 9/2005 | Duell .................. B01F 35/2132 366/136 |
| 2006/0028914 | A1 | 2/2006 | Phillippi et al. |
| 2006/0065400 | A1 | 3/2006 | Smith |
| 2006/0107998 | A1 | 5/2006 | Kholy et al. |
| 2006/0289166 | A1 | 12/2006 | Stromquist et al. |
| 2007/0014653 | A1 | 1/2007 | Glenn et al. |
| 2007/0114035 | A1 | 5/2007 | Parris et al. |
| 2007/0179326 | A1 | 8/2007 | Baker |
| 2007/0201305 | A1 | 8/2007 | Heilman et al. |
| 2007/0277982 | A1 | 12/2007 | Shampine et al. |
| 2008/0008562 | A1 | 1/2008 | Beckel et al. |
| 2008/0066911 | A1 | 3/2008 | Luharuka et al. |
| 2008/0073895 | A1 | 3/2008 | Herman et al. |
| 2008/0179054 | A1 | 7/2008 | McGough et al. |
| 2008/0264641 | A1 | 10/2008 | Slabaugh et al. |
| 2009/0078410 | A1 | 3/2009 | Krenek et al. |
| 2009/0078792 | A1 | 3/2009 | Vlasak |
| 2009/0090504 | A1 | 4/2009 | Weightman |
| 2010/0038077 | A1 | 2/2010 | Heilman et al. |
| 2010/0071284 | A1 | 3/2010 | Hagan et al. |
| 2010/0188926 | A1* | 7/2010 | Stegemoeller .......... B01F 23/59 366/160.5 |
| 2010/0243251 | A1 | 9/2010 | Luharuka et al. |
| 2010/0243252 | A1 | 9/2010 | Luharuka et al. |
| 2010/0243255 | A1 | 9/2010 | Luharuka et al. |
| 2010/0278621 | A1 | 11/2010 | Redekop |
| 2010/0319921 | A1 | 12/2010 | Eia et al. |
| 2010/0329072 | A1 | 12/2010 | Hagan et al. |
| 2011/0003720 | A1 | 1/2011 | Sullivan |
| 2011/0026358 | A1 | 2/2011 | Cheio De Oliveira |
| 2011/0061855 | A1 | 3/2011 | Case et al. |
| 2011/0063942 | A1 | 3/2011 | Hagan et al. |
| 2011/0127178 | A1 | 6/2011 | Claussen |
| 2011/0197536 | A1 | 8/2011 | Clark |
| 2012/0024738 | A1 | 2/2012 | Herman et al. |
| 2012/0048537 | A1 | 3/2012 | Rettie et al. |
| 2012/0127820 | A1 | 5/2012 | Noles, Jr. |
| 2012/0127822 | A1 | 5/2012 | Noles, Jr. |
| 2012/0128449 | A1 | 5/2012 | Fikes et al. |
| 2012/0134772 | A1 | 5/2012 | Herman et al. |
| 2012/0167485 | A1 | 7/2012 | Trevithick et al. |
| 2012/0219291 | A1 | 8/2012 | Chiku |
| 2012/0219391 | A1 | 8/2012 | Teichrob et al. |
| 2012/0255734 | A1 | 10/2012 | Coli et al. |
| 2012/0273206 | A1 | 11/2012 | Zamora et al. |
| 2012/0298210 | A1 | 11/2012 | Pham et al. |
| 2013/0105166 | A1 | 5/2013 | Medvedev et al. |
| 2013/0150268 | A1 | 6/2013 | Oldham |
| 2013/0269735 | A1 | 10/2013 | Roetzel et al. |
| 2013/0288934 | A1 | 10/2013 | Powell et al. |
| 2013/0309052 | A1 | 11/2013 | Luharuka et al. |
| 2013/0315026 | A1* | 11/2013 | Cheio De Oliveira ...................... B01F 35/718 366/134 |
| 2013/0324444 | A1 | 12/2013 | Lesko et al. |
| 2014/0041317 | A1 | 2/2014 | Pham et al. |
| 2014/0041319 | A1 | 2/2014 | Pham et al. |
| 2014/0041322 | A1 | 2/2014 | Pham et al. |
| 2014/0044508 | A1 | 2/2014 | Luharuka et al. |
| 2014/0166647 | A1 | 6/2014 | Sheesley et al. |
| 2014/0255265 | A1 | 9/2014 | Kulkarni et al. |
| 2014/0364346 | A1 | 12/2014 | Weinstein |
| 2015/0044003 | A1 | 2/2015 | Pham |
| 2015/0044004 | A1 | 2/2015 | Pham et al. |
| 2015/0064077 | A1 | 3/2015 | McSpadden et al. |
| 2015/0166260 | A1 | 6/2015 | Pham et al. |
| 2015/0238912 | A1 | 8/2015 | Luharuka et al. |
| 2015/0238913 | A1 | 8/2015 | Luharuka et al. |
| 2015/0238914 | A1 | 8/2015 | Luharuka et al. |
| 2015/0240148 | A1 | 8/2015 | Luharuka et al. |
| 2016/0129418 | A1 | 5/2016 | Pham et al. |
| 2016/0130924 | A1 | 5/2016 | Pham et al. |
| 2017/0327309 | A1 | 11/2017 | Hunter et al. |

FOREIGN PATENT DOCUMENTS

| | | | |
|---|---|---|---|
| CN | 2693601 | Y | 4/2005 |
| CN | 101434836 | A | 5/2009 |
| CN | 201317413 | Y | 9/2009 |
| CN | 201458370 | U | 5/2010 |
| CN | 201610285 | U | 10/2010 |
| CN | 202398329 | U | 8/2012 |
| CN | 202506322 | U | 10/2012 |
| CN | 203486442 | U | 3/2014 |
| CN | 103721619 | A | 4/2014 |
| CN | 204109871 | U | 1/2015 |
| EP | 0048312 | A1 | 3/1982 |
| EP | 0241056 | A1 | 10/1987 |
| EP | 2609999 | A1 | 7/2013 |
| FR | 2655007 | A1 | 5/1991 |
| JP | S5715828 | | 1/1982 |
| KR | 10-0589613 | | 6/2006 |
| RU | 10418 | | 7/1999 |
| RU | 2228842 | C2 | 5/2004 |
| WO | 8500046 | A1 | 1/1985 |
| WO | 1985000046 | A1 | 1/1985 |
| WO | 2002044517 | A1 | 6/2002 |
| WO | 2007022300 | A3 | 7/2007 |
| WO | 2007098606 | A1 | 9/2007 |
| WO | 2010070599 | A1 | 6/2010 |
| WO | 2011061503 | A1 | 5/2011 |
| WO | 2011088493 | A1 | 7/2011 |
| WO | 2012121896 | A2 | 9/2012 |
| WO | 2012166590 | A1 | 12/2012 |
| WO | 2013099826 | A1 | 7/2013 |
| WO | 2013134624 | A1 | 9/2013 |
| WO | 2014028317 | A1 | 2/2014 |

OTHER PUBLICATIONS

Fracturing technology for ultra-low permeability reservoirs, written by Ran Xinquan, Petroleum Industry Press, pp. 223-224, Feb. 2012.

Practical Technical Manual for Dairy Product Engineer, edit by Gu Ming, pp. 605-607, China Light Industry Press, Jan. 2009.

* cited by examiner

MIXING APPARATUS WITH FLUSH LINE AND METHOD

CROSS-REFERENCE TO RELATED APPLICATION

This application is a continuation of U.S. patent application Ser. No. 14/192,838 filed on Feb. 27, 2014 and entitled "Mixing Apparatus with Flush Line and Method," which is incorporated herein by reference in its entirety for all purposes.

BACKGROUND

Mixers (sometimes alternatively referred to as "blenders") are generally employed to disperse powdered chemicals into fluids. One application for mixers is in wellbore operations, for example, in preparing hydraulic fracturing fluid for injection into a subterranean formation. Generally, the fracturing fluid includes gelling agents, powders and other granular material, e.g., guar gum, which are initially dispersed into the fluid via the mixer, and subsequently hydrated, e.g., in tanks, to result in the desired viscosity for the fluid.

Certain powder and granular material mixers include a centrifugal pump and eductor, or a centrifugal or high or low shear blender for dispersing the powder and granular material into fluid (e.g., water). Generally, the fluid is pumped by the pump into a mixing chamber. In eductor mixers, the mixing chamber may be proximal to a throat of a converging-diverging nozzle such that the eductor draws the powder into the mixing chamber by the Venturi effect. In blender mixers, the blender is located in the mixing chamber, and the powders and grains are fed thereto, e.g., by gravity. In either case, the materials, e.g., in the form of dry powder, are introduced to the mixing chamber, and are dispersed into the fluid. Various devices are employed to avoid air entrainment during the dispersion process, or entrained air may be removed downstream, e.g., using a hydro-cyclone or another type of air separator. The fluid mixture may then be sent to equipment downstream for further hydration.

One challenge in dispersing powder additives such as gelling agents is that the powders may tend to agglomerate into clumps, sometimes referred to as "fisheyes." The powders may have cohesive properties, such that partially-hydrated balls form, e.g., with dry powder surrounded by a "skin" of partially-hydrated powder. This skin prevents hydration of the dry powder within, resulting in a stable fisheye in the fluid, rather than an even dispersion of the powder. As such, suboptimal mixing may result, which can affect downstream application. Moreover, there is an additional risk of buildup and/or clogging of the material, e.g., in the various throats of the system, if the materials are not sufficiently wetted at the point of introduction into the mixer.

Accordingly, in some instances, a pre-wetter may be employed to mitigate the risk of such clumping. Pre-wetters generally provide a fluid to the powder feed, upstream of the mixing. However, pre-wetters require a separate pump to deliver the fluid to the powder, upstream of the mixing chamber. Thus, additional pumping equipment (i.e., centrifugal pumps to provide fluid to pre-wetter) may complicate the overall system, adding costs, maintenance, and failure points. Moreover, the different pieces of equipment may limit the range of flowrates achievable for the system, limiting the applications for which a single size or configuration of mixer is suitable.

SUMMARY

Embodiments of the disclosure may provide a mixer that includes an impeller, a slinger, and a flush line. The impeller and slinger may be disposed in a back-to-back arrangement as part of an impeller/slinger assembly, and may be rotated via a connection with a shaft. The impeller draws fluid into the mixing chamber via a fluid inlet, pressurizes the fluid, and expels the fluid downward and outward. The fluid is then turned toward the slinger. The slinger may, through an additive inlet, receive additives that are to be mixed into the fluid, and may propel the additives radially outward, so as to mix the additives with the fluid.

The flush line may include an opening in the mixing chamber at a relatively high-pressure region of the mixing chamber, for example, near the impeller. The relatively high-pressure region may also be an area of relatively clean fluid (e.g., low concentration of additives) that may be tapped by the flush line. The flush line may extend to an additive-channeling structure (e.g., a cone or other type of hopper) through which the additives are received into the additive inlet. Using the pressure of the fluid in the mixing chamber, as provided by the impeller, the flush line may channel the relatively clean fluid from the mixing chamber to the additive-channeling structure, so as to pre-wet the additive, thereby reducing the potential for clumping.

While the foregoing summary introduces one or more aspects of the disclosure, these and other aspects will be understood in greater detail with reference to the following drawings and detailed description. Accordingly, this summary is not intended to be limiting on the disclosure.

BRIEF DESCRIPTION OF THE DRAWINGS

The accompanying drawings, which are incorporated in and constitute a part of this specification, illustrate an embodiment of the present teachings and together with the description, serve to explain the principles of the present teachings. In the figures.

Figure 1:
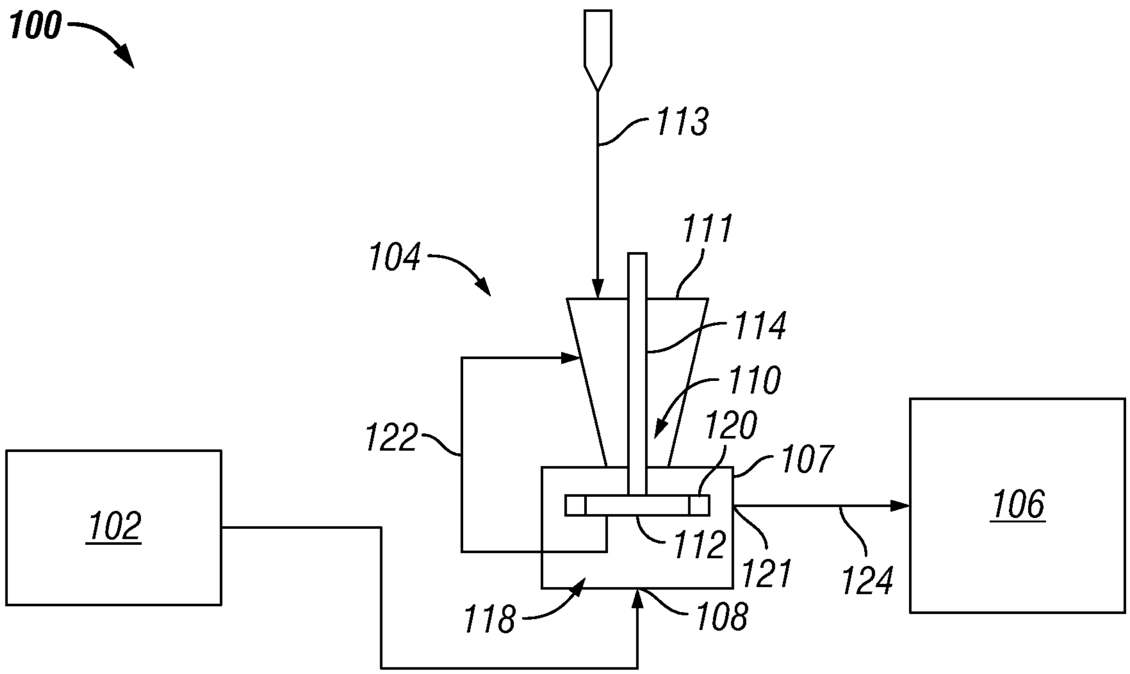
FIG. 1 illustrates a schematic view of a mixing system, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present disclosure, examples of which are illustrated in the accompanying drawings. In the drawings and the following description, like reference numerals are used to designate like elements, where convenient. It will be appreciated that the following description is not intended to exhaustively show all examples, but is merely exemplary.

FIG. 1 illustrates a schematic view of a mixing system 100, according to an embodiment. The mixing system 100 may generally include a process fluid source 102, a mixer 104, and downstream equipment 106, among other potential components. The process fluid source 102 may be or include a tank of water, a water-based solution of a suitable pH and/or any other type of solution, or any substantially liquid substance. Further, the source 102 may include or be coupled with one or more pumps for delivery of the fluid to the mixer 104; however, in other embodiments, such pumps may be omitted with the mixer 104 providing the pumping, for example. The downstream equipment 106 may include any number of hydrating tanks, separators, other mixers/mixing systems, pumps, etc., so as to convert a slurry exiting the mixer 104 into a desired viscosity and/or composition fluid.

As schematically depicted, the mixer 104 may include a housing 107 as well as a fluid inlet 108 and an additive inlet 110 extending through the housing 107. The fluid inlet 108 may be coupled with the fluid source 102 and may be configured to receive fluid (i.e., the process fluid) therefrom. The additive inlet 110 may generally include an additive-receiving structure 111, which may be or include a cone, chamber, bowl, hopper, or the like, having an inner surface 115 configured to receive an additive 113, which may be a dry powder, and direct it into the housing 107, e.g. via gravity feed.

It will be appreciated that any dry, partially dry, crystalized, slurry, fluid, or pelletized, and/or packaged additive may be dispersed or otherwise mixed into the fluid using the mixer 104 via the additive inlet 110, as schematically depicted. Further, as will be described in greater detail below, additives received through the additive inlet 110 may be pre-wetted into a partial slurry, e.g., to avoid fisheyes and/or any material buildup. In particular, in various embodiments, the mixer 104 may be configured for use in mixing sand, guar, other powders, etc. with the fluid. Further, in some cases, the mixer 104 may be configured for use as a macerator, which may tear apart fibers, pouches containing powders, pellets, etc. for dispersion of its contents into the fluid. In at least one case, the mixer 104 may be configured for use in creating gel for use in fracturing operations, e.g., in a wellbore; however, the mixer 104 may be employed for any number of different uses, consistent with the present disclosure.

The mixer 104 may also include an impeller/slinger assembly 112, which may be driven by a shaft 114. The housing 107 may define a mixing chamber 118 therein that is in communication with the inlets 108, 110. The impeller/slinger assembly 112 may be disposed in the mixing chamber 118. Rotation of the impeller/slinger assembly 112 may pump the fluid from the source 102 through the mixing chamber 118 and into the outlet 121.

As shown, the shaft 114 may extend upwards, through the inlet 110 and out of the additive-receiving structure 111; however, this is but one example among many contemplated. In another example, the impeller/slinger assembly 112 may extend downward through the bottom of the housing 107, may be magnetically driven, driven internally within the mixing chamber 118, or may be otherwise disposed in the housing 107. The shaft 114 may be coupled with the impeller/slinger assembly 112, such that rotation of the shaft 114 rotates the impeller/slinger assembly 112. In various cases, the shaft 114 may be directly coupled to the impeller/slinger assembly 112, e.g. via a bolt; however, in other cases, gears, linkages, other speed-changing devices, or couplings may be employed to connect the shaft 114 to the impeller/slinger assembly 112.

The mixer 104 may also include a stator 120, which may be in the form of a ring, arcuate portion, etc., which may be disposed around the impeller/stator assembly 112, as will be described in greater detail below. Further, the mixer 104 may include an outlet 121 and a flush line 122. The outlet 121 may receive a slurry formed from a combination of the additive received through the additive inlet 110 and the fluid received through the fluid inlet 108. The outlet 121 may direct the slurry to one or more conduits 124, which may carry the fluid to the downstream equipment 106.

The flush line 122 may communicate with an area of the mixing chamber 118 that is proximal to the impeller/slinger assembly 112 on one end, and with the additive-receiving structure 111 on the other end. Accordingly, the flush line 122 may tap the process fluid from the mixing chamber 118 at an area of relatively high pressure and deliver it to the inner wall of the additive-receiving structure 111, which may be at a reduced (e.g., ambient) pressure. In addition to being at the relatively high pressure, the fluid tapped by the flush line 122 may be relatively "clean" (i.e., relatively low additives content, as will be described below), so as to pre-wet fluid to the additive-receiving structure 111 and promote the avoidance of clumping of the additives. In some cases, the flush line 122 may provide the pre-wetting fluid without requiring additional pumping devices (apart from the pumping provided by the impeller/slinger assembly 112) or additional sources of fluid or lines from the source 102. In other examples, booster pumps, etc., may be provided in addition to or in lieu of tapping the fluid from the mixing chamber 118.

Figure 2:
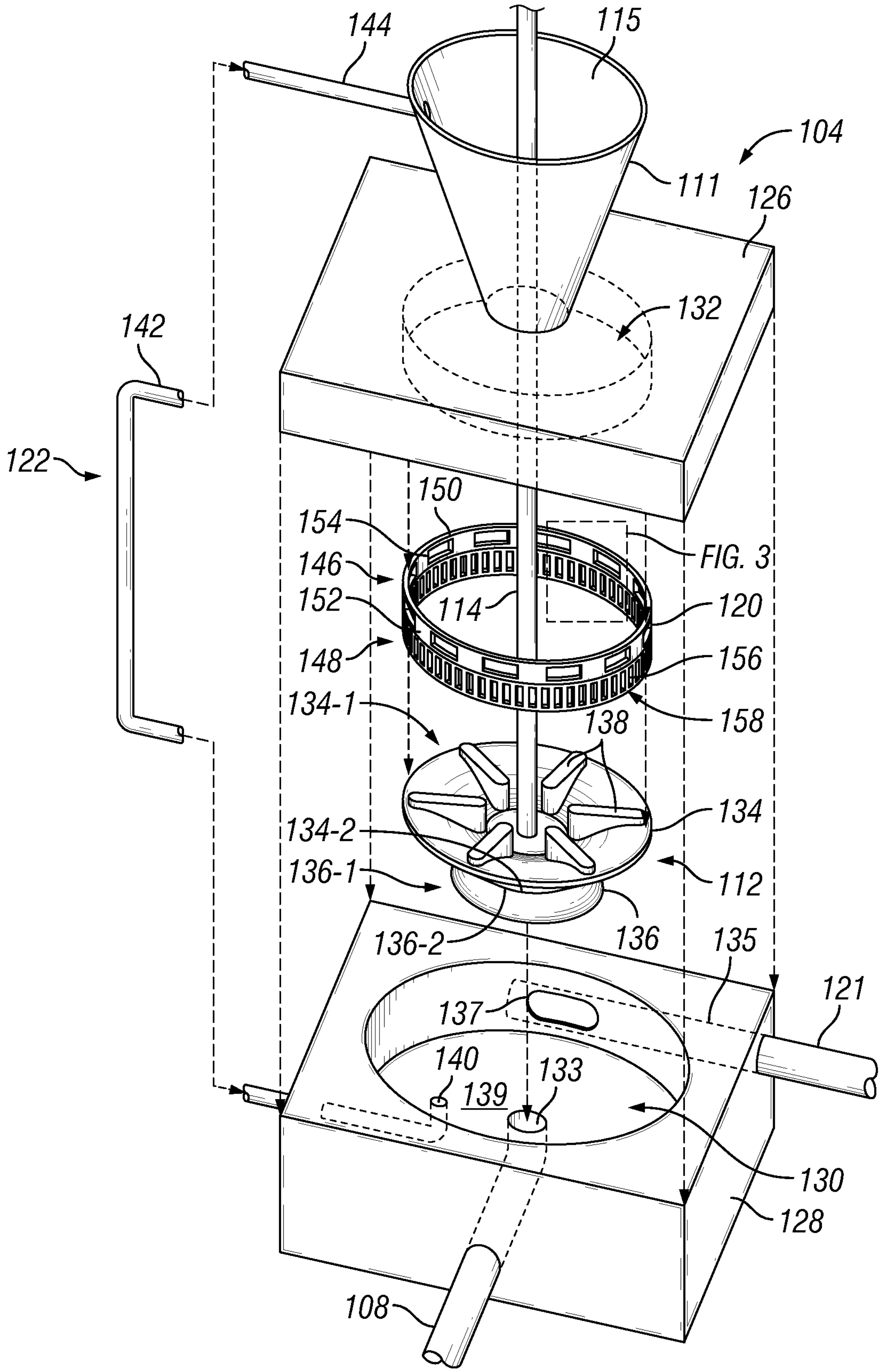
FIG. 2 illustrates an exploded, perspective view of the mixer, according to an embodiment.

FIG. 2 illustrates an exploded perspective view of the mixer 104, according to an embodiment. As noted above, the mixer 104 may include the housing 107, which is depicted in FIG. 2 as formed from two portions: a first or "upper" housing portion 126 and a second or "lower" housing portion 128. The upper and lower housing portions 126, 128 may be connected together, e.g., via bolts, clamps, other fasteners, adhesives, welds, etc., so as to define the mixing chamber 118 (FIG. 1) therebetween. In one specific example, the lower housing portion 128 may define a mixing area 130, and the upper housing portion 126 may define a mixing area 132 (shown in phantom), which may be generally aligned. The mixing areas 130, 132 may together define the mixing chamber 118 (FIG. 1), in which the impeller/slinger assembly 112 and the stator 120 may be disposed. The lower housing portion 128 may also include an interior surface 139, e.g., defining the bottom of the mixing area 130. It will be appreciated that a variety of configurations of the housing 107, including unitary and segmented embodiments, embodiments with doors, etc. are contemplated.

The upper housing portion 126 may be coupled with the additive-receiving structure 111 and may provide the additive inlet 110. The lower housing portion 128 may include the fluid inlet 108, which may extend through the lower housing portion 128 to a generally centrally-disposed opening 133. In an embodiment, the opening 133 may be defined in the interior surface 139. In addition, the outlet 121 may extend from the mixing area 130, for example, including a substantially tangential conduit 135 extending from an opening 137 communicating with the mixing area 130.

Turning to the impeller/slinger assembly 112 disposed in the mixing chamber 118, the impeller/slinger assembly 112 may include a slinger 134 and an impeller 136. The slinger 134 and the impeller 136 may have inlet faces 134-1, 136-1, respectively, and backs 134-2, 136-2, respectively. The inlet faces 134-1, 136-1 may be each be open (as shown) or at least partially covered by a shroud, which forms an inlet in the radial inner part of the slinger 134 and/or impeller 136. Moreover, the inlet faces 134-1, 136-1 may be oriented in opposite directions, e.g., to receive fluid and/or dry components. The backs 134-2, 136-2 may be disposed proximal to one another and, e.g., coupled together, such that, for example, the impeller 136 and the slinger 134 are disposed in a “back-to-back” configuration.

In an embodiment, the inlet face 134-1 of the slinger 134 may face the additive inlet 110 (e.g., the additive-receiving structure 111), while the inlet face 136-1 of the impeller 136 may face the fluid inlet 108 (e.g., the opening 133), as shown. For example, the inlet face 136-1 of the impeller 136 may face the interior surface 139, with the opening 133, defined on the interior surface 139, being aligned with a radial middle of the impeller 136.

Accordingly, as defined by the direction in which the inlet faces 134-1, 136-1 are oriented, the slinger 134 may face upwards, as shown, but in other embodiments may face downwards or in a lateral direction. Similarly, the impeller 136 may face downwards, as shown, but in other embodiments, may face upwards or in a lateral direction. Further, the slinger 134 and the impeller 136 may each have a radius, with the radius of the slinger 134 being larger than the radius of the impeller 136. The radii of the slinger 134 and impeller 136 may be dependent upon one another, so as to control a position of a fluid-air boundary, as will be described in greater detail below.

The slinger 134 may further define a saucer-shape, as shown, i.e., formed generally as a flatter (or flat) middle with arcuate sides and the inlet face 134-1. In an embodiment, the sides may be formed, for example, similar to, or as part of a torus that extends around the middle of the slinger 134. In another embodiment, the slinger 134 may be bowl-shaped (e.g., generally a portion of a sphere). Further, the slinger 134 may include slinger blades 138 on the inlet face 134-1. The number of blades 138 may range from about two blades to about 20 blades, for example, about nine blades. In some cases, the blades 138 may be curved circumferentially as proceeding radially outwards from the shaft 114, but in others the blades 138 may be straight, as shown. When rotated, the slinger 134 may be configured to propel fluid and/or dry additives received from the inlet 110 radially outwards by interaction with the blades 138 and upwards (as shown), e.g., as influenced by the shape of the slinger 134.

Although not visible in FIG. 2, the impeller 136 may also include a plurality of blades on the inlet face 136-1, which may be generally aligned with the opening 133. When the shaft 114 is turned, the impeller blades may draw fluid through the opening 133 of the fluid inlet 108, and then expel the fluid downwards and radially outwards. As such, a region of relative high pressure may develop between the lower housing portion 128 and the impeller 136, which may act to drive the fluid around the mixing chamber 118 and toward the slinger 134.

The flush line 122 may include an opening 140 defined in the lower housing portion 128 proximal to this region of high pressure. For example, the opening 140 may be defined in the interior surface 139 at a position between the outer radial extent of the impeller 136 and the opening 133 of the inlet 110. In other embodiments, the opening 140 may be disposed on the interior surface 139 and radially outside of the impeller 136 and/or elsewhere in the mixing chamber 118. The flush line 122 may also include a conduit 142, which may be or include one or more pipes, tubes, hoses, flow restrictors, check valves, etc. The conduit 142 may connect with a cone inlet 144 defined, for example, substantially tangent to the additive-receiving structure 111, such that fluid is transported from the opening 140 via the conduit 142, through the cone inlet 144, and into the additive-receiving structure 111. The fluid may then take a generally helical path along the interior of the additive-receiving structure 111, until it is received through the additive inlet 110 to the slinger 134. As such, the fluid received through the cone inlet 144 may generally form a wall of fluid along the inner surface 115 of the additive-receiving structure 111.

In at least one specific embodiment, a pressure gradient may develop between the impeller 136 and the lower housing portion 128, with the pressure in the fluid increasing as proceeding radially outwards from the opening 133. Another gradient, related to the concentration of the additives in the fluid may also develop in this region, with the concentration of additives increasing as proceeding radially outward. In some cases, a high pressure head and low concentration may be desired, so as to provide a flow of relatively clean fluid through the flush line 122, propelled by the impeller/slinger assembly 112. Accordingly, the opening 140 for the flush line 122 may be disposed at a point along this region that realizes an optimal tradeoff between pressure head of the fluid and concentration of the additives in the fluid received into the flush line 122. Additional details regarding the tradeoff are provided below.

Turning again to the stator 120, the stator 120 may form a shearing ring, which may be received around the radial outside of the impeller/slinger assembly 112 and in the mixing chamber 118 (FIG. 1). In an example, the stator 120 may be coupled with the upper housing portion 126, e.g., via bolts, other fasteners, adhesives, welding, etc.

Figure 3:
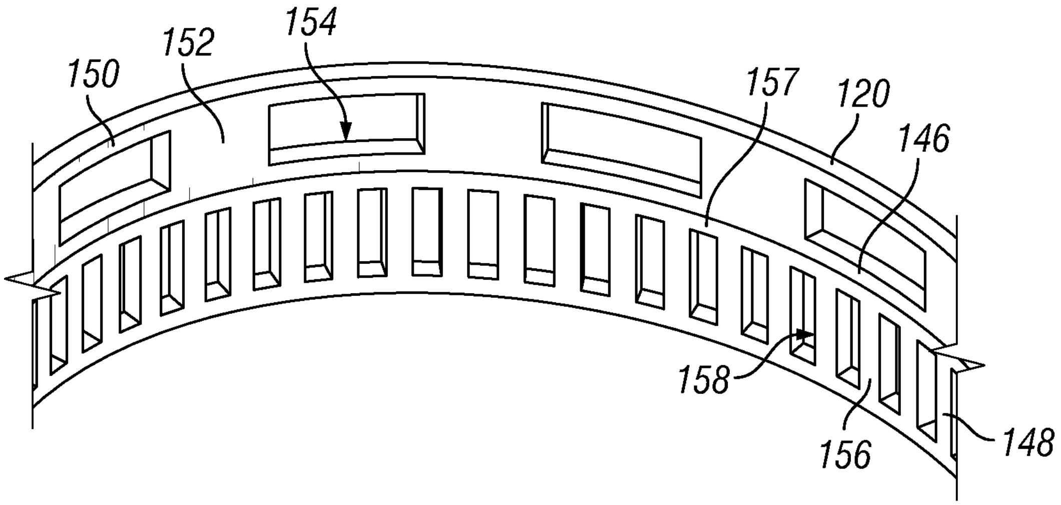
FIG. 3 illustrates an enlarged view of a portion of the stator of the mixer illustrated in FIG. 2, according to an embodiment.

FIG. 3 illustrates an enlarged sectional view of the stator 120 of FIG. 2, according to an embodiment. Referring now to both FIGS. 2 and 3, as shown, the stator 120 may include first and second annular portions 146, 148, which may be stacked together to form the stator 120. The stator 120 may be held generally stationary with respect to the rotatable impeller/slinger assembly 112, e.g., via fastening with the upper housing portion 126. In another embodiment, the stator 120 may be supported by the impeller/slinger assembly 112 and may rotate therewith. In either example, the stator 120 may ride on the inlet face 134-1 of the slinger 134, or may be separated therefrom.

The first annular portion 146 may be configured to minimize flow obstruction. As shown, in some cases, the first annular portion 146 may include a shroud 150 and posts 152 defining relatively wide slots 154, allowing relatively free flow of fluid therethrough. In other embodiments, the first annular portion 146 may omit the shroud 150, as will be described in greater detail below.

While the first annular portion 146 may minimize flow obstruction, the second annular portion 148 may be configured to maximize flow shear, so as to promote turbulent mixing, and thus may include a series of stator vanes 156 that are positioned closely together around the stator 120. Narrow flowpaths 158 may be defined between stator vanes 156; however, the sum of areas of the flowpaths 158 may be less than the sum of the areas of the stator vanes 156. In various embodiments, the ratio of the stator vane 156 cross-sectional area (i.e., the area that obstructs flow) to the area of the flowpaths 158 may be between about 1:2 and about 4:1, for example, about 1.5:1. Further, the area of each of the stator vanes 156 may be greater than the area of each of the flowpaths 158. Moreover, the stator vanes 156 may be disposed at any pitch angle with respect to the circumference of the stator 120. For example, the stator vanes 156 may be oriented straight radial, against rotation (e.g., to increase shear), or with rotation. In the example illustrated in FIG. 2 (and also in FIGS. 3 and 4, described below), the stator vanes 156 may have a shroud 157 that separates the sections 146, 148. In other embodiments, as will be described in greater detail below, the stator 120 may omit either or both of the shrouds 150, 157.

Figure 5:
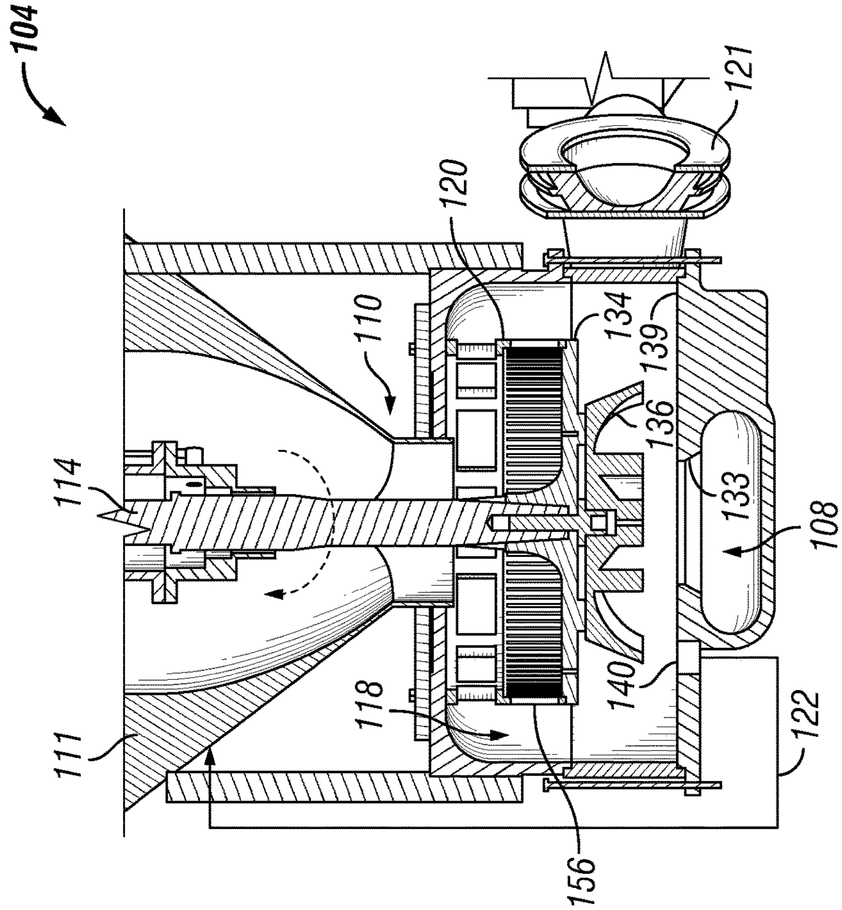
FIG. 5 illustrates a side, cross-sectional view of the mixer, according to an embodiment.
Figure 4:
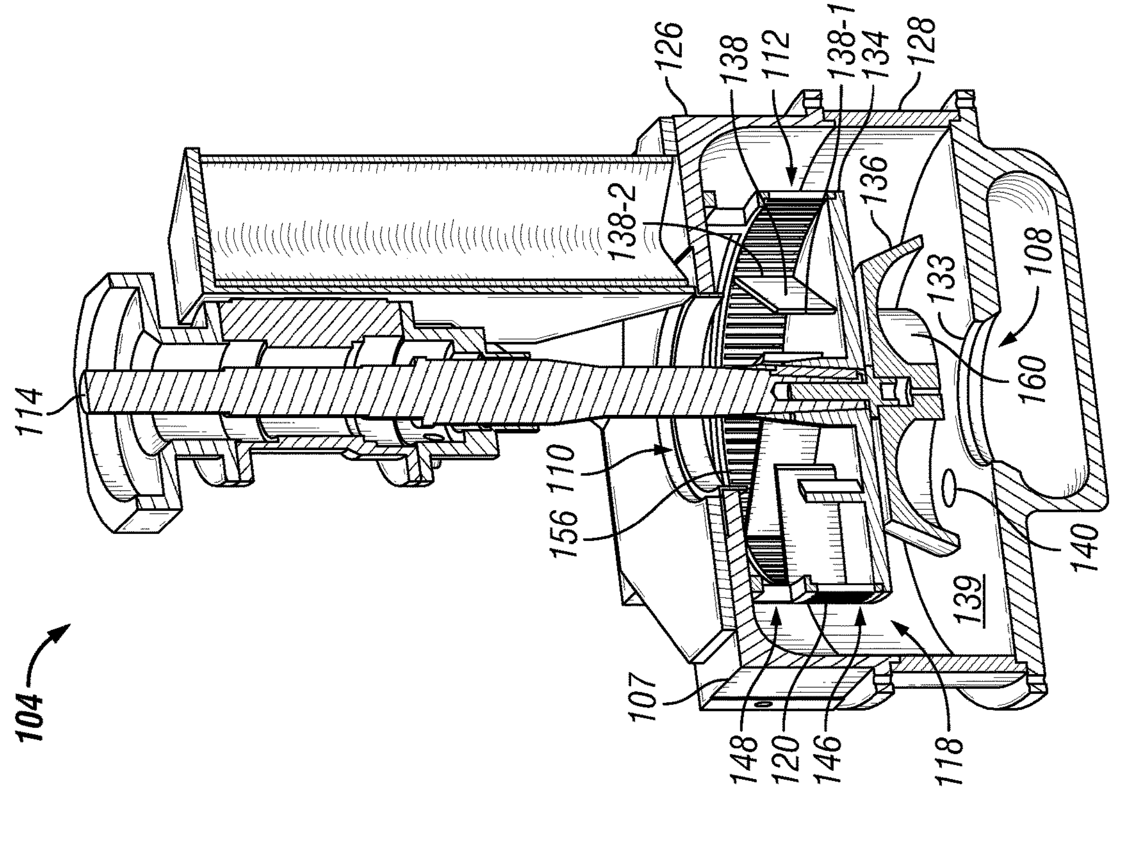
FIG. 4 illustrates a perspective view of a section of the mixer, according to an embodiment.

FIG. 4 illustrates a perspective view of a section of the mixer 104, according to an embodiment. FIG. 5 illustrates a side cross-sectional view of the mixer 104, with the flush line 122 illustrated schematically, according to an embodiment. Referring to both FIGS. 4 and 5, the shaft 114 extends through the additive inlet 110 and is coupled with the impeller/slinger assembly 112. The impeller 136 faces the opening 133, such that impeller blades 160 of the impeller 136 draw fluid through the inlet 108 via the opening 133.

Figure 6:
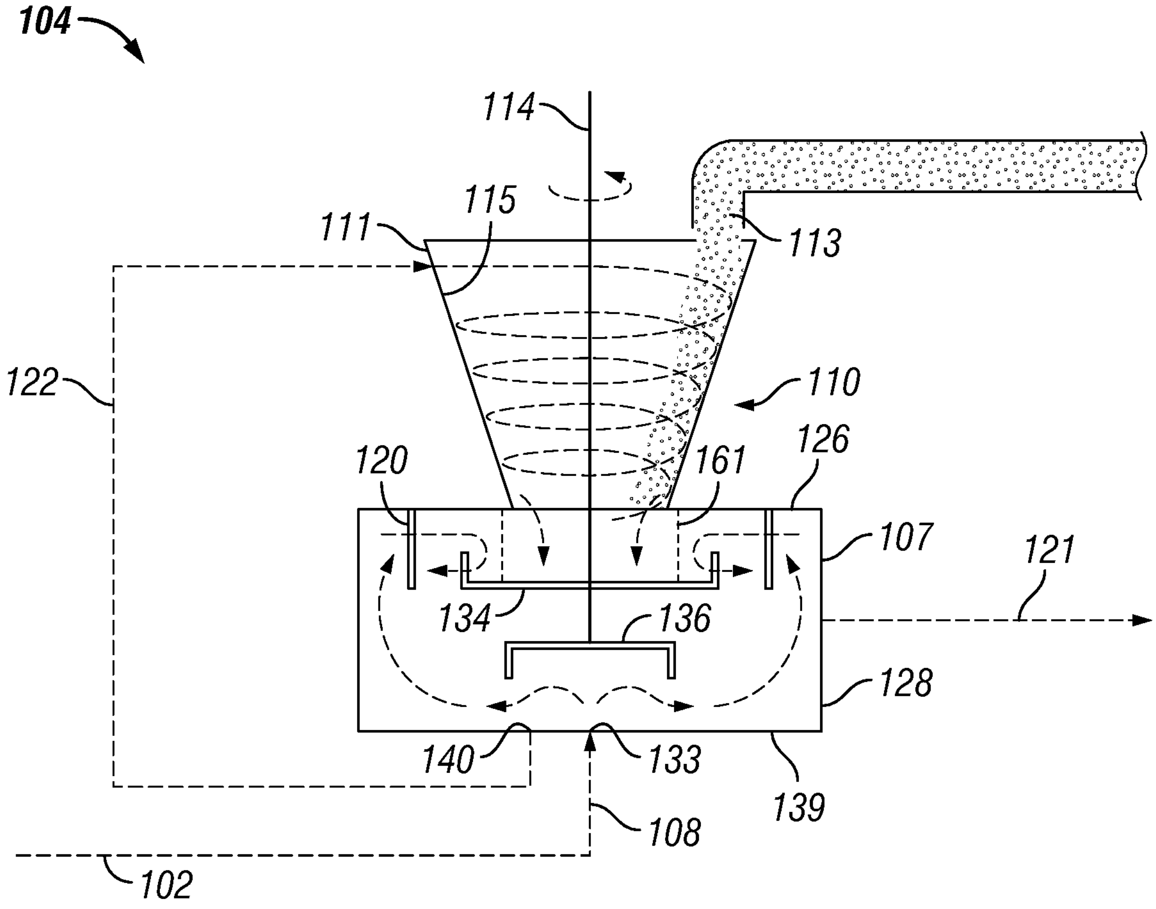
FIG. 6 illustrates a side schematic view of the mixer, according to an embodiment.

With continuing reference to FIGS. 4 and 5, FIG. 6 schematically illustrates a simplified view of the cross-section of the mixer 104, according to an embodiment. As shown, the impeller 136 may draw the fluid upward from the interior surface 139, and then expel it downwards (toward the interior surface 139) and radially outward. The fluid may then move upward in the mixing chamber 118, e.g., along an outer wall of the housing 107 to the top of the upper housing portion 126, where it may be turned radially inwards. The fluid may then proceed through the first annular portion 146 of the stator 120 to the slinger 134, and then be pushed radially outward, as well as upward, back toward the upper housing portion 126. This may create a turbulent churning, as well as a hydrodynamically-stable interface between the fluid and the air, generally manifesting as a ring-shaped air-fluid boundary or "eye" 161 (FIG. 6) between a root 138-1 and a tip 138-2 of the slinger blades 138. The slinger 134 thus tends to create a cyclonic separation effect, whereby air received through the inlet 110 is prevented from entrainment in the fluid received from the impeller 136.

Meanwhile, the additives 113 are poured into or otherwise received through the inlet 110, e.g., propelled by gravity, but may also be propelled by pressure differentials, vacuums, blowers, pumps, etc. The additives are then received onto the inlet face of the slinger 134, e.g., on the air side of the air-fluid boundary. The additives collide with the blades 138 and are slung radially outward into the fluid received from the impeller 136, while producing a circumferential velocity component to the fluid and dry additives. The circumferentially- and radially-driven dry additives and fluid then pass through the second annular portion 148 of the stator 120, where the combination is subjected to a high shear by interaction with the stator vanes 156 as it passes through the flowpaths 158. The shearing provided by the interaction with the blades 138 and stator vanes 156 and the turbulent flow developed by the impeller/slinger assembly 112 may provide a generally uniform dispersion of the additives in the fluid from the source 102, resulting in a slurry.

In particular, the first section 146 of the stator 120 is disposed at a small radial clearance from the slinger blades 138 (e.g., radially outward therefrom) such that the slurry mixture of additives 113 (e.g., powdered chemicals) and fluid being slung outward by the slinger blades 136 is sheared in a first stage in the clearance, by the relative movement of the blades 134 and the stator vanes 156. The slurry is then subjected to a second shear stage, as it is squeezed between the adjacent stator vanes 156 and pushed radially outwards through the flowpaths 158 by the action of the slinger 134. Moreover, the sudden expansion of the flow area radially outside of the stator 120 results in cavitation, further promoting mixing. As such, the mixer 104 provides, in operation, a two-stage, high shearing and regional cavitation mixing. The second section 148 of the stator 120 may have a substantially larger opening and be disposed above the slinger blades such that it allows the fluids to enter the slinger 134 through the slots 154, or otherwise minimizes flow obstruction through the stator 120.

The slurry may undergo such mixing multiple times, churning back through portions of the slinger 134 to effect further dispersion of the additives into the fluid, and eventually reaches the outlet 121, as shown in FIG. 5. The slurry reaching the outlet 121 is channeled from the mixing chamber 118, e.g., to downstream equipment 106 (FIG. 1) for further hydration, deployment, treatment, etc. Further, as schematically depicted in FIG. 5, the mixer 104 may also provide a self-regulating pre-wetter with the flush line 122. The opening 140 may be disposed in the interior surface 139 of the lower housing portion 128, e.g., radially inside or outside of the outer radial extent of the impeller 136. This may represent an area of high pressure in the mixing chamber 118, which is "clean" relative to fluid in other parts of the mixing chamber 118, e.g., proximal to the outlet 121 and/or in the slinger 134.

The tapped, relatively clean fluid received via the opening 140 may flow through the flush line 122 to the additive-receiving structure 111. The pre-wetting fluid may then flow, e.g., by gravity, along the interior surface of the additive-receiving structure 111 through the inlet 110 and back to the slinger 134. As such, the additives may be urged along the additive-receiving structure 111, toward the slinger 134, while being pre-wetted therein. This may serve to minimize clumping along the surface of the additive-receiving structure 111.

Figure 7:
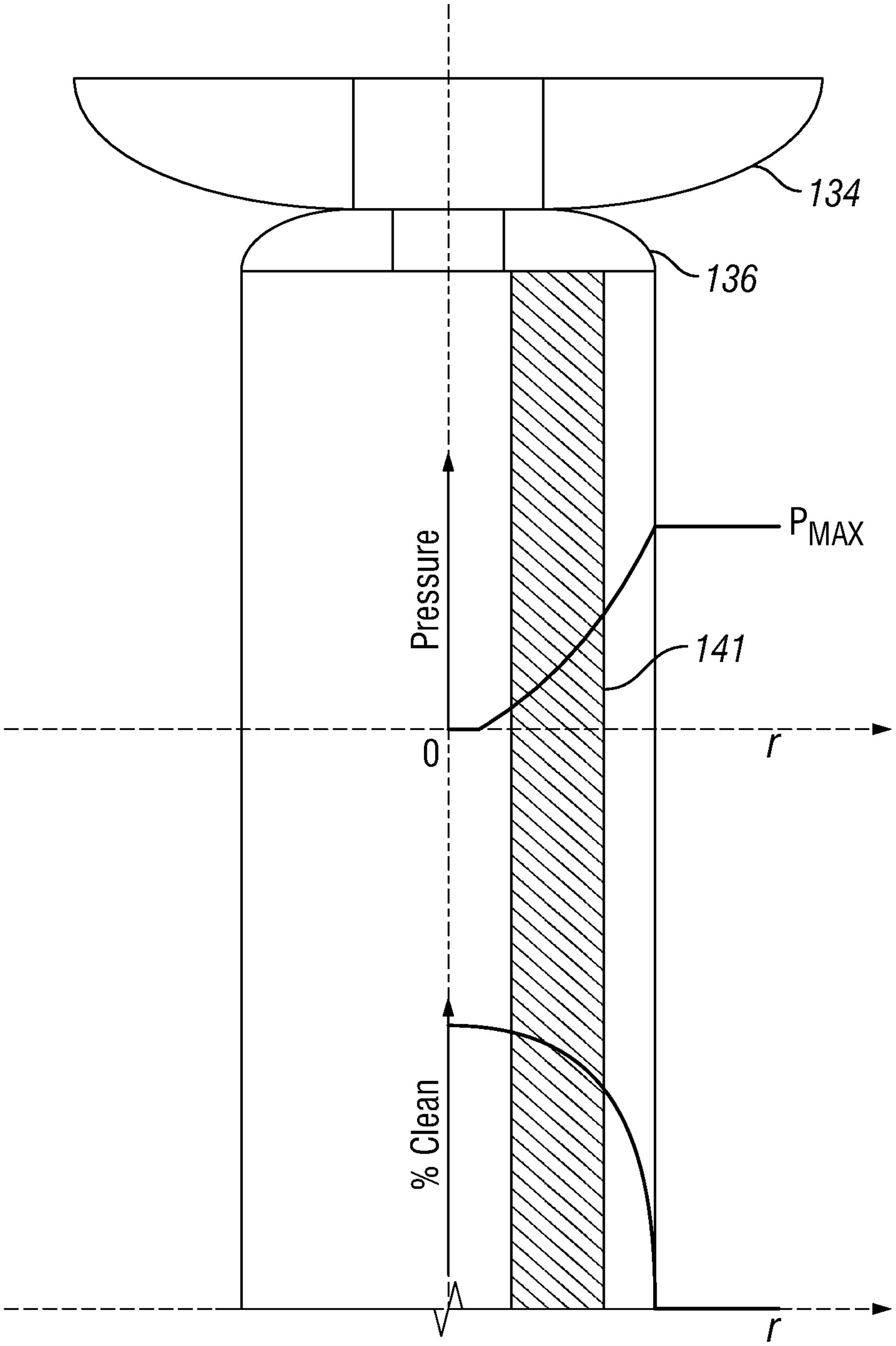
FIG. 7 illustrates a plot of pressure and cleanliness of the fluid versus radius, according to an embodiment.

FIG. 7 illustrates a plot of pressure and cleanliness in the fluid in the mixing chamber 118 versus the radius from the center of the opening 133, which is aligned with the center of the impeller 136. As shown, proceeding radially outward with respect to the impeller 136, the pressure may move from ambient (i.e., zero psig) to a maximum pumping pressure provided by the impeller 136. The relationship between radial position and pressure head may be generally exponential, until the position reaches the radial extent of the impeller 136.

Conversely, the "cleanliness," that is, the inverse of the concentration of additives in the fluid, or, stated otherwise, the purity of the fluid, may decrease proceeding radially outward, as the fluid received through the inlet 108 is mixed with the additives. Accordingly, a tapping region 141 may be calculated, providing the optimal tradeoff between pressure head and cleanliness in the fluid tapped by the flush line 122 via the opening 140.

Moreover, the flowrate of the relatively clean fluid through the flush line 122 may be controlled, for example, by matching a location or size of the opening 140, the conduit 142, and/or the cone inlet 144 to the pressure head developed by the impeller 136. With a known pressure drop through the flush line 122, such control may result in an optimized amount of fluid flowing through the flush line 122. Further, the flush line 122 may include one or more flow control devices, which may further allow for adjustment of the flowrate through the flush line 122.

Figure 8:
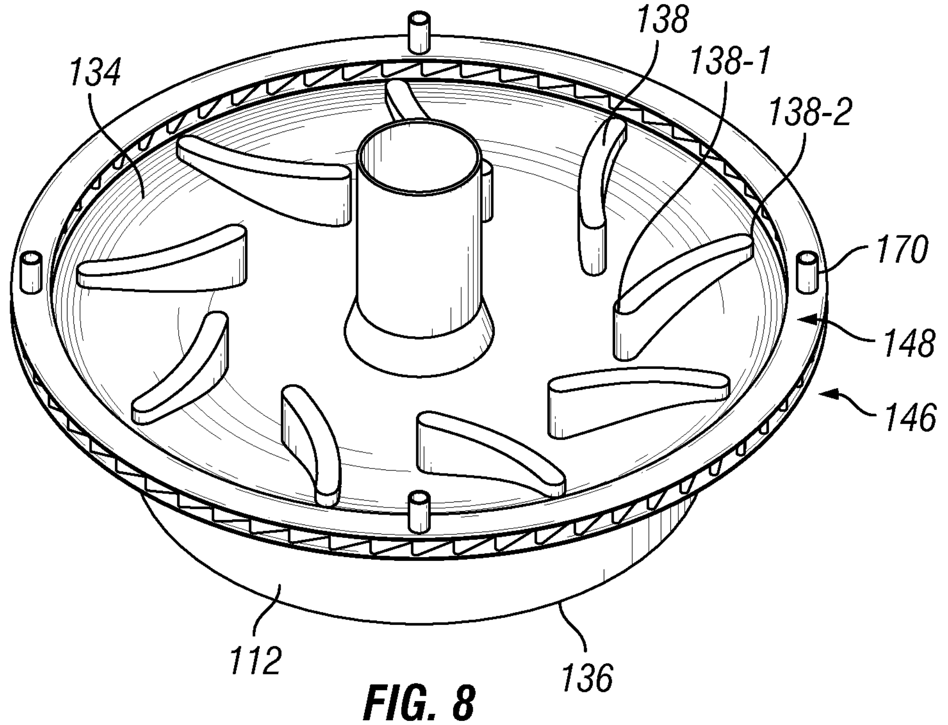
FIG. 8 illustrates a perspective view of an impeller/slinger assembly of the mixer, according to an embodiment.

FIG. 8 illustrates a perspective view of the impeller/slinger assembly 112 and the stator 120, according to an embodiment. The stator 120 may include the first and second annular portions 146, 148, as described above. However, the second annular portion 148 may include a plurality of posts 170, which may extend upwards from the first annular portion 146, but may not include a shroud. For example, the posts 170 may be coupled to the upper housing portion 126 (FIG. 2). The posts 170 may be any shape, including cylindrical, aerofoils, etc. and may be spaced apart so as to define wide channels therebetween. Accordingly, the second annular portion 148 may be configured to minimize flow obstruction therethrough.

Moreover, as shown, the stator vanes 156 may be pitched at an angle relative to the circumference of the stator 120, for example, opposite to rotation, so as to maximize shearing. Similarly, the slinger blades 138 may be curved circumferentially, e.g., to facilitate slinging the fluid and additives radially outwardly, and with a circumferential velocity component, so as to produce the shearing.

The stator 120 illustrated in FIG. 8 may act as a diffuser. In at least one embodiment, the stator vanes 156, as illustrated, may be oriented to recover pressure and/or may facilitate air introduction into the slurry, for example, in foaming operations.

Figure 9:
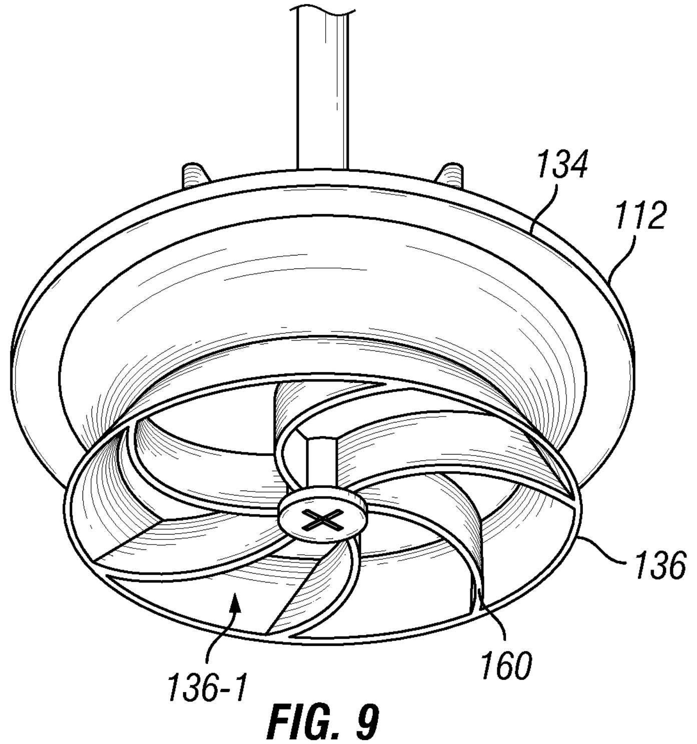
FIG. 9 illustrates another perspective view of the impeller/slinger assembly, according to an embodiment.

FIG. 9 illustrates another perspective view of the impeller/slinger assembly 112, illustrating the inlet face 136-1 of the impeller 136, according to an embodiment. As shown, the blades 160 of the impeller 136, which may be curved, straight, or any other suitable geometry, may draw fluid upwards, and then expel it radially outwards into the mixing chamber 118 (e.g., FIG. 3). It will be appreciated that the impeller 136 may be configured for high-speed (e.g., between about 300 rpm and about 20,000 rpm) use, and may be capable of pumping of producing between about 5 psi (about 34 kPa) and about 150 psi (about 1000 kPa), e.g., about 60 psi (about 414 kPa) of head.

Figure 10:
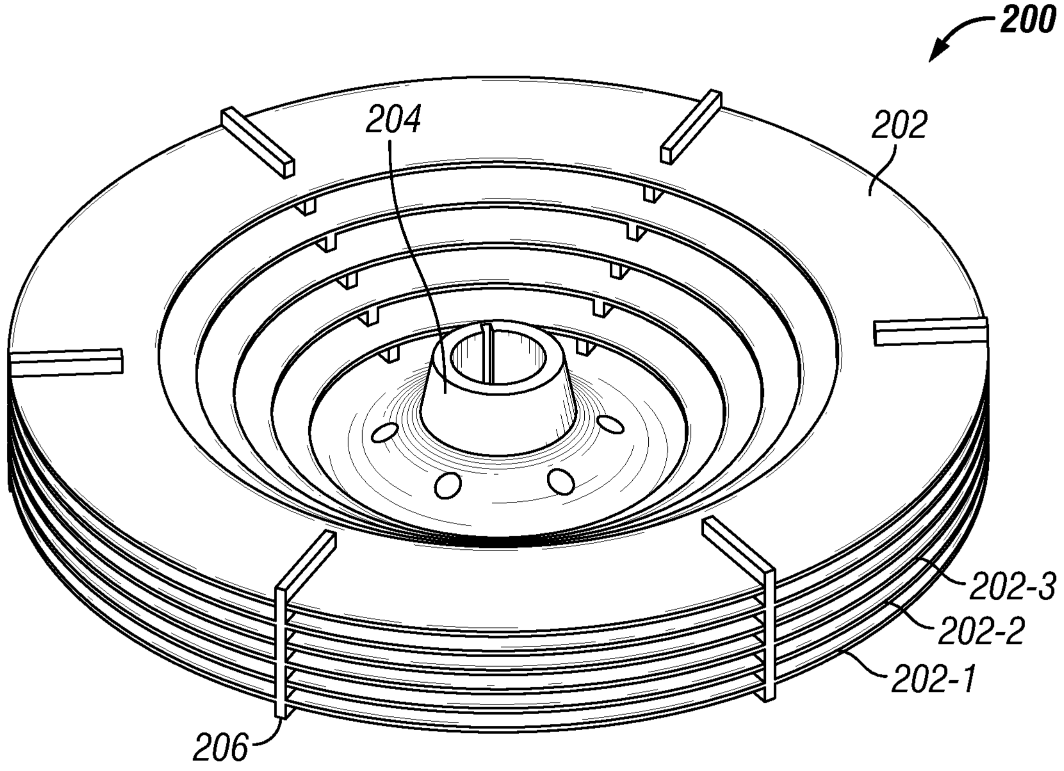
FIG. 10 illustrates a perspective view of a slinger of the mixer, according to an embodiment.

FIG. 10 illustrates a perspective view of another slinger 200 of the mixer 104, according to an embodiment. In some cases, rotor blades (such as blades 138 as shown in FIG. 1) may achieve dispersion that exceeds desired rates, e.g., with engineered particles such as encapsulated breakers. This may cause, in some cases, premature release of chemicals in the fluid. Accordingly, in an embodiment, the slinger 200 may provide a low shear or controlled shear dispersion that can handle such delicate chemicals, which are prone to damage or otherwise unsuitable for use in the more-aggressive slinger embodiments. In particular, the slinger 200 may effect a relatively gradual dispersion using generally concentric, annular disks 202, which are stacked one on top of the other upward from a hub 204. The annular disk 202-1 closest to the hub 204 may have a smaller inner diameter than the annular disk 202-2 adjacent thereto, which in turn may have a smaller inner diameter than the annular disk 202-3. This may repeat as proceeding between adjacent disks 202 away from the hub 204, so as to provide an inlet face 205 for the slinger 200 through which fluid and/or additives may be received and propelled outwards. It will be appreciated that any number of annular disks 202 may be included.

In an embodiment, the disks 202 may be held apart by vanes 206, providing narrow flowpaths between the disks 202. The vanes 206 may provide slots, one for each of the annular disks 202, into which the annular disks 202 may be received and coupled to the vanes 206. Accordingly, the narrow paths may extend radially outwards, for example, obstructed in the radial direction only by the narrow vanes 206. In other embodiments, separate vanes may extend between each pair of adjacent disks 202, rather than or in addition to the vanes 206 that extend through the entire set of disks 202. Moreover, in some embodiments, the vanes 206 may couple with one or more subsets of the total number of disks 202. In some cases, the vanes 206 may be omitted, with the disks 202 held together in a spaced-apart relation in any other suitable manner.

The large surface area of the annular disks 202 bordering the flowpaths, and the narrowness of the flowpaths, may result in shearing and turbulent flow of the fluid therethrough. Such shearing may have a similar effect as the slinger 134 and stator 120 discussed above, and may promote dispersion of dry additives into fluid being slung radially outwards therethrough, while minimizing the impact forces from the vanes 204 which may damage more delicate material. In some cases, the shearing provided by the slinger 200 may result in the stator 120 being omitted; however, in other cases, the shearing effects of the stator 120 and the slinger 200 may be combined.

Figure 11:
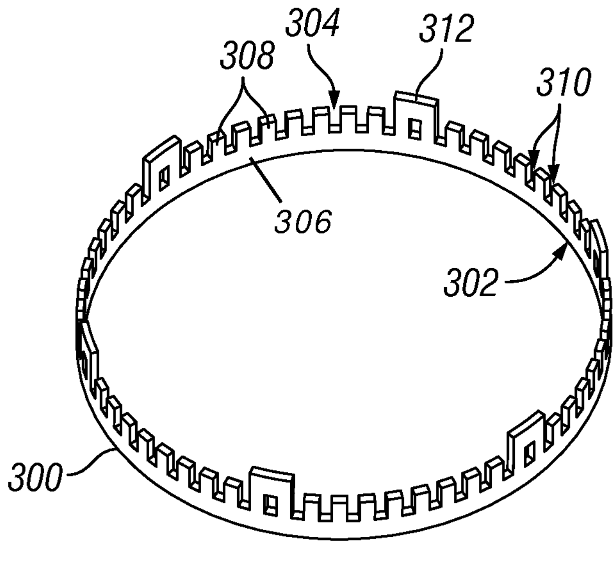
FIG. 11 illustrates a perspective view of a stator of the mixer, according to an embodiment.

FIG. 11 illustrates a perspective view of a shroudless stator 300, according to an embodiment. As shown, the stator 300 includes first and second annular portions 302, 304, which may, as shown, both be shroudless. The first annular portion 302 may include a base 306 and a series of vanes 308 extending upwards from the base 306 and disposed at intervals around the first annular portion 302. Flowpaths 310 are defined between adjacent vanes 308.

With the stator 300 being shroudless, the top of the flowpaths 310 may be open-ended, opening into the second annular portion 304 of the stator 120. The second annular portion 304 may include tabs 312 extending upwards from the first annular portion 302. The tabs 312 may be thicker, circumferentially, than the vanes 308, for example, each spanning two vanes 308 and one of the flowpaths 310; however, any relative sizing of the vanes 308 and tabs 312 may be employed. The shroudless configuration may minimize obstruction of the flow from the impeller 136, increasing efficiency of the mixer 104.

Figure 12:
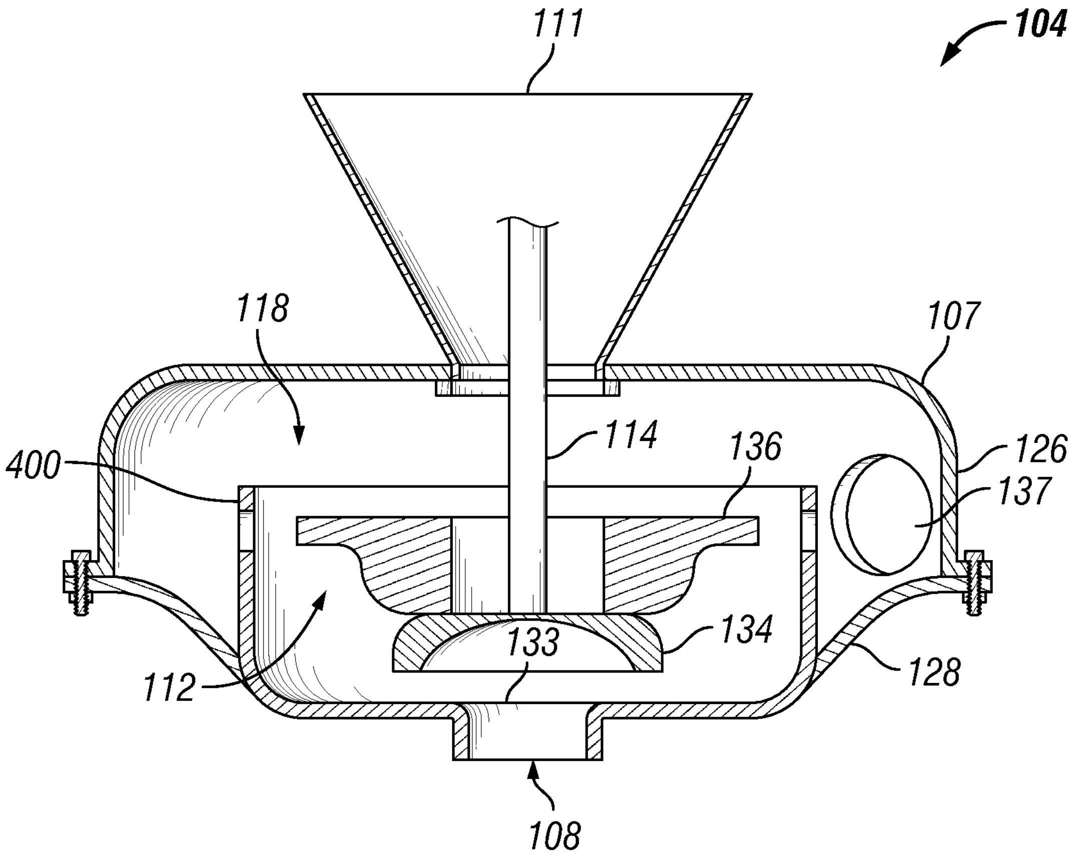
FIG. 12 illustrates a side, cross-sectional view of another embodiment of the mixer.

FIG. 12 illustrates a side, cross-sectional view of the mixer 104, according to another embodiment. The embodiment shown in FIG. 12 may be generally similar to the embodiment of the mixer 104 shown in one or more of FIGS. 1-8, with similar components being referred to using like numerals and duplicative description being omitted herein. The mixer 104 shown in FIG. 12 may, however, have a stator 400 that is integrated with the housing 107, for example, with the lower housing portion 128. Accordingly, the stator 400 may be spaced radially apart from and may circumscribe the impeller/slinger assembly 112, with the outlet 121 being disposed radially outward of the stator 400. Supporting (and/or integrating) the stator 400 by the lower housing portion 128 may facilitate low friction rotation of the impeller/slinger assembly 112, since the stator 400 and the impeller/slinger assembly 112 may not be in contact with one another. In another embodiment, the stator 400 may be suspended from and/or integrated with the upper housing portion 126 to similar effect.

This embodiment of the mixer 104 may, in some cases, ensure all or substantially all of the incoming fluid is mixed with the additive chemical before exiting the mixer 104. For example, in cement mixing, the mixer 104 may blend the powder uniformly, so as to avoid relying on the pipe turbulence downstream of the mixer 104 to effect such mixing.

As with the stator 120, the stator 400 may be shrouded or shroudless, and may include two or more annular portions (e.g., one for low flow disruption and one for high flow disruption). The stator 400 may, however, be configured to receive substantially all fluid flow out of the volume of fluid, which may enhance bulk mixing. Such a mixer 104 embodiment employing the stator 400 may be suited for powder dispersion into a very viscous fluid medium as well as when powder volume fraction in the mixture is high, e.g., with cement mixing. Additionally, although not shown, embodiments of the mixer 104 shown in FIG. 12 may include a flush line 122, e.g., as described above.

Figure 13:
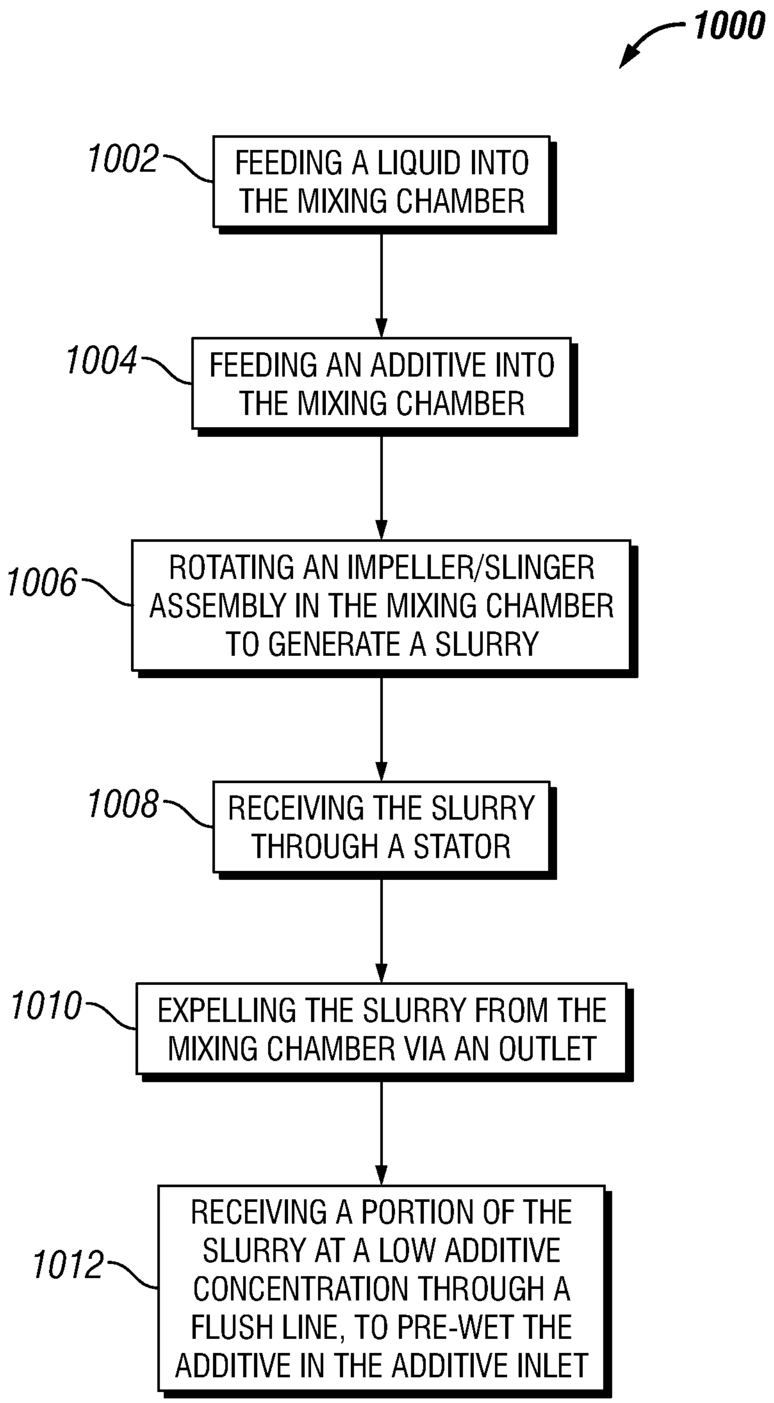
FIG. 13 illustrates a flowchart of a method for dispersing an additive in a fluid, according to an embodiment.

FIG. 13 illustrates a flowchart of a method 1000 for dispersing an additive, such as a dry additive (e.g., powder, granules, etc.) into a fluid, according to an embodiment. The method 1000 may proceed by operation of one or more embodiments of the mixing system 100 and/or the mixer 104 and, thus, is described herein with reference thereto. However, it will be appreciated that the method 1000 is not limited to any particular structure, unless otherwise expressly stated herein.

The method 1000 may include feeding a fluid into the mixing chamber 118 of the mixer 104 through the fluid inlet 108, as at 1002. For example, the mixing chamber 118 may be defined within the housing 107, which may define the fluid inlet 108 that receives the fluid from the source 102. The method 1000 may also include feeding the additive into the mixing chamber 118 through the additive inlet 110, as at 1004. The feeding at 1004 may be propelled by gravity, for example, by pouring the additive into the additive-receiving structure 111 of the additive inlet 110, although other methods for feeding the additive are also contemplated.

The method 1000 may also include rotating the impeller/slinger assembly 112 disposed in the mixing chamber 118, as at 1006. Rotating the impeller/slinger assembly 112 may draw fluid from the fluid inlet 108 (e.g., upwards) and radially outward, for example, by action of the impeller 136 disposed with its inlet face 136-1 proximal to the interior surface 139. Rotating the impeller/slinger assembly 112 may further cause the fluid, e.g., received from the impeller 136, along with the additive received through the additive inlet 110, to be slung radially outward. In an example, the outward slinging may be caused by the slinger 134 of the impeller/slinger assembly 112, which may include blades 138 and/or disks 202. Further, the slinger 134 may include an inlet face 134-1, which may, for example, be oriented toward the additive inlet 110. When the additive is fed through the additive inlet 110, the additive may impinge on the blades 138 and/or disks 202 and be slug radially outward The combination of the impeller 136 and the slinger 134, e.g., in a back-to-back configuration, may result in an eye defined by a hydrodynamically-stable fluid-air boundary, to develop in the slinger 134. For example, the boundary may be present radially between a hub 138-1 and tip 138-2 of the blades 138 of the slinger 134. The slinging of the additive (as well as the fluid received from the impeller 136) radially outwards by action of the slinger 134 may result in the additive crossing the air-fluid boundary, and thus being at least partially dispersed into the fluid, thereby forming a slurry. In some cases, the action of the impeller/slinger assembly 112 may create a hydrodynamically-stable eye, forming a fluid-air boundary, thereby preventing air from becoming entrained in the fluid. However, in some cases, air may be purposely introduced into the mixture, for example, in foaming applications, e.g., using the stator 120 of FIG. 8.

The additive may further be dispersed in the fluid, promoting increased homogenization of the slurry, by the slurry being received through the stator 120, as at 1008. Various embodiments of the stator 120 are discussed above, e.g., with the first and second annular portions 146, 148 provided to minimize and maximize fluid shearing, respectively. In general, the stator 120 may include the plurality of vanes 156, defining flowpaths therebetween, through which the slurry is received. The interaction of the swirled, turbulent flow of the slurry with the stator vanes 156 may result in increased shearing of the fluid, which may increase mixing efficiency of the mixer 104. Once mixed to a desired degree, the slurry with a certain concentration of additives may be expelled from the mixer 104, as at 1010, via the outlet 121, which may be disposed radially outwards of the impeller/slinger assembly 112.

The method 1000 may also include, e.g., as caused by rotation of the impeller/slinger assembly 112 at 1006, a portion of the fluid or slurry (e.g., with a relatively low concentration, relative to flow through the outlet 121) to flow into the flush line 122 and to the additive inlet 110, to pre-wet the additive, as at 1012. For example, the flush line 122 may include the opening 140, which may be positioned and/or sized so as to receive a slurry with a predetermined (e.g., minimized) concentration of additives at a predetermined (e.g., maximized) pressure in the mixing chamber 118. The sizing of the flush line 122, placement of the opening 140 thereof, and/or employment of flow control devices in the flush line 122, etc. may allow control of the amount of fluid that proceeds through the flush line 122 and the composition thereof.

It will be appreciated that terms implying a direction or an orientation, e.g., "up," "down," "upwards," "downwards," "above", "below," "laterally," and the like are employed merely for convenience to indicate relative positioning of the components with respect to each other, as depicted in the various figures. One of ordinary skill in the art will appreciate that these terms are not intended to limit the mixer 104 to any particular orientation, however.

Further, while the present teachings have been illustrated with respect to one or more embodiments, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A mixer, comprising:
a housing having a mixing chamber, wherein the housing comprises an upper housing portion and a lower housing portion;
a fluid inlet configured to couple to the lower housing portion of the mixing chamber and configured to deliver a fluid;
an impeller disposed within the lower housing portion and configured to draw the fluid into the mixing chamber from the fluid inlet;
a slinger disposed within the lower housing portion and configured to receive the fluid from the impeller and an additive from an additive inlet, wherein the slinger is configured to mix the fluid and the additive;
a stator disposed around the impeller and the slinger; and
a flush line configured to couple to the lower housing portion and extend from the lower housing portion to the additive inlet, wherein the flush line is configured to receive a portion of the fluid from an opening positioned downstream from the impeller and directly deliver the portion of the fluid to the additive inlet.

2. The mixer of claim 1, wherein the flush line is configured to couple to the lower housing portion within an annular chamber.

3. The mixer of claim 1, wherein the flush line is configured to provide the portion of the fluid to pre-wet the additive to reduce clumping of the additive.

4. The mixer of claim 1, wherein the additive inlet comprises an additive-receiving structure extending from the upper housing portion of the mixing chamber and comprising an inner surface configured to receive the additive and the portion of the fluid from the flush line, wherein the additive-receiving structure is configured to pre-wet the additive upstream of the slinger and the impeller, and wherein the flush line and the additive inlet are both configured to couple to the additive-receiving structure.

5. The mixer of claim 4, wherein the additive-receiving structure comprises a cone, a chamber, a bowl, or a hopper.

6. The mixer of claim 4, wherein the flush line comprises an outlet positioned to deliver the portion of the fluid at a trajectory that is substantially tangent to the additive-receiving structure.

7. The mixer of claim 1, wherein the flush line and the fluid inlet are configured to couple to an axial end wall of the lower housing portion.

8. The mixer of claim 1, wherein the flush line is configured to couple to the lower housing portion at a radial distance less than or equal to an outer radius of the impeller.

9. The mixer of claim 1, wherein the fluid inlet is configured to couple to the lower housing portion at a central axis and the flush line is configured to couple to the lower housing portion at a radial distance from the central axis.

10. The mixer of claim 1, wherein the slinger is disposed in a chamber within the stator, wherein the additive inlet is configured to direct a first flow comprising the additive and the portion of the fluid in a first direction into the mixing chamber and the slinger is configured to direct a second flow comprising the fluid and the additive in a second direction into the mixing chamber, wherein the first direction and the second direction are axially opposite one another relative to a central axis.

11. A mixer comprising:
an additive inlet extending from a housing having a mixing chamber and configured to receive an additive, wherein the housing comprises an upper housing portion and a lower housing portion;
an impeller/slinger assembly disposed within the mixing chamber of the housing and configured to receive a fluid via a fluid inlet and the additive via the additive inlet, wherein the fluid inlet is configured to couple to the lower housing portion;
a stator disposed around the impeller/slinger assembly; and
a flush line configured to couple to the lower housing portion and extend from the lower housing portion to the additive inlet, wherein the flush line is configured to receive a portion of the fluid from an opening below from the impeller/slinger assembly and directly deliver the portion of the fluid to the additive inlet.

12. The mixer of claim 11, wherein the additive inlet is configured to receive the portion of the fluid to pre-wet the additive upstream of the impeller/slinger assembly.

13. The mixer of claim 11, wherein the stator comprises a first annular portion having a first shroud with a plurality of posts and a second annular portion having a second shroud with a plurality of stator vanes.

14. The mixer of claim 13, wherein the plurality of posts define a plurality of slots and the plurality of stator vanes define a plurality of flow paths, and wherein the additive and the fluid flow through the plurality of slots and the plurality of flow paths.

15. The mixer of claim 11, wherein the flush line is configured to be axially offset from the impeller/slinger assembly relative to a central axis.

16. A mixer, comprising:
a housing comprising:
an upper housing portion configured to couple to an additive inlet to receive an additive; and
a lower housing portion positioned adjacent to the upper housing portion and configured to couple to a fluid inlet and a flush line, wherein the fluid inlet is configured deliver a fluid to the lower housing portion; and
an impeller/slinger assembly disposed within the housing and configured to pump the fluid from the fluid inlet and to mix the fluid and the additive,
wherein the flush line is configured to receive a portion of the fluid pumped by the impeller/slinger assembly and directly deliver the portion of the fluid to the additive inlet.

17. The mixer of claim 16, comprising a stator forming a ring and disposed around the impeller/slinger assembly, wherein the stator comprises a first annular portion having a plurality of posts and a second annular portion having a plurality of stator vanes.

18. The mixer of claim 16, wherein the flush line and the fluid inlet are configured to couple to an axial end wall of the lower housing portion.

19. The mixer of claim 16, wherein the flush line couples to the lower housing portion at a radial distance less than or equal to an outer radius of an impeller of the impeller/slinger assembly.

20. The mixer of claim 19, wherein the flush line couples to the lower housing portion with an annular chamber.

* * * * *